United States Patent [19]

Hilliker

[11] 3,872,265

[45] Mar. 18, 1975

[54] VIDEO DISC TRANSMISSION LINE AND STYLUS RF RETURN SYSTEMS

[75] Inventor: Stephen Earl Hilliker, Morresville, Ind.

[73] Assignee: RCA Corporation, New York, N.Y.

[22] Filed: Oct. 10, 1972

[21] Appl. No.: 295,854

[52] U.S. Cl. .......... 179/100.4 M
[51] Int. Cl. .......... H04n 5/76
[58] Field of Search .......... 179/100.4 M

[56] References Cited

UNITED STATES PATENTS

| | | | |
|---|---|---|---|
| 2,408,695 | 10/1946 | Sinnett | 179/100.4 M |
| 2,436,946 | 3/1948 | Tatro | 179/100.4 M |
| 2,469,803 | 5/1949 | Weathers | 179/100.4 M |
| 2,548,211 | 4/1951 | Frantz | 179/100.4 M |
| 2,682,579 | 6/1954 | Weathers | 179/100.4 M |
| 2,866,856 | 12/1958 | Weathers | 179/100.4 M |
| 3,406,264 | 10/1968 | Phillipson | 179/100.4 D |
| 3,711,641 | 1/1973 | Palmer | 360/73 |
| 3,783,196 | 1/1974 | Stanley | 179/100.4 M |

FOREIGN PATENTS OR APPLICATIONS

| | | | |
|---|---|---|---|
| 1,181,275 | 11/1964 | Germany | 178/6.6 A |
| 153,300 | 2/1922 | United Kingdom | 179/100.1 B |

*Primary Examiner*—Vincent P. Canney
*Assistant Examiner*—Alan Faber
*Attorney, Agent, or Firm*—Eugene M. Whitacre; William H. Meagher

[57] ABSTRACT

An information playback system, for recovering information recorded on a record medium, includes a pickup stylus having a conductive element establishing a capacitance with the record medium that varies with the recorded information, a conductive support housing, and a flexibly mounted conductive member supporting the pickup stylus and forming a transmission line with the surrounding support housing. The flexibly mounted conductive member has one end movably connected to the support housing and the second end mechanically coupled to the stylus to provide mechanical support therefor. An electrical connection is provided between the flexibly mounted conductive member and the conductive element of the stylus to establish a tuned circuit including the reactances of the transmission line and of the variable capacitance formed between the stylus and the record medium. A source of signal energy coupled to the tuned circuit energizes the tuned circuit such that signals modulated by the record information are developed in the tuned circuit. When the stylus is in playing position, capacitance between the support housing and the record medium is established with sufficient magnitude to provide a low impedance path for the modulated signals between the record medium and the support housing, completing the tuned circuit connections in a manner advantageous to pickup sensitivity.

13 Claims, 8 Drawing Figures

PATENTED MAR 18 1975 3,872,265

VIDEO DISC TRANSMISSION LINE AND STYLUS RF RETURN SYSTEMS

BACKGROUND OF THE INVENTION

The present invention relates to an information playback system and more particularly to the pickup assembly of a video information playback system.

In certain information playback systems, video information is recorded on a disc record by means of modulations which can subsequently be sensed as capacitive variations. One video disc record incorporates geometric variations in the bottom of a spiral groove in a disc surface. The groove disc surface includes a conductive material covered with a thin coating of dielectric material. A tracking stylus has a conductive surface which cooperates with the conductive material and dielectric coating to form a capacitance which varies due to the geometric variations as the record is rotated during playback. Systems of this type are shown in U.S. Pat. application Ser. No. 126,772, filed Mar. 22, 1971, for John Kauffmann Clemens and entitled "INFORMATION RECORDS AND RECORDING/PLAYBACK SYSTEM THEREFOR," and my U.S. patent application Ser. No. 258,645, filed June 1, 1972 and entitled "INFORMATION PLAYBACK SYSTEM." Both applications are assigned to the RCA Corporation.

In systems of the above described type, a stylus riding in a groove on the disc record forms a capacitor with the metalization on the record, this capacitance varying as the record is rotated. These capacitive variations are part of a tuned circuit, the resonant frequency of the tuned circuit varying as the capacitance between the stylus and record varies. The tuned circuit is energized through inductive coupling to a fixed frequency oscillator. Since fixed frequency oscillator signals are applied to the tuned circuit, the resonant frequency of the tuned circuit will vary due to the variations of the capacitance between the stylus and the record. Therefore, the response of the tuned circuit to the excitation signal voltage changes as a function of the record information. This provides output signals whose amplitude varies as a function of the record information. The amplitude varying output signals are detected by a voltage doubling peak detector, amplified, and applied to the playback system signal processing circuitry.

In systems of the above described type, the percentage modulation of the signals detected by the voltage doubling peak detector is a function of the ratio of the change in capacitance between the stylus and the record to the total equivalent capacitance of the tuned circuit. Since the change in capacitance may be very small, the percentage modulation of the detected signal may also be very small. This makes recovery of the recorded information difficult due to swamping by the circuit and other noise introduced into the system. It is therefore desirable to increase the percentage modulation of the detected signal by minimizing the total equivalent capacitance of the tuned circuit.

Tuned circuits of the type that were used in my application cited above, had a transmission line for providing the equivalent inductance and capacitance for the tuned circuit with the stylus connected to the transmission line providing a change in capacitance thereby changing the frequency response of the tuned circuit.

It can be seen from the above discussion that the reactance of the transmission line and of the stylus are very determinitive of the frequency response of the tuned circuit. The changing of a stylus, the record, and the variation in the manufacturing and assembly of the above system all effect the total shunt capacitance of the tuned circuit. It is therefore desirable to limit this change in capacitance to be as small as possible.

In my copending application described above, I had an electrical connection between the transmission line and the stylus for detecting the change in capacitance between the stylus and the record. This connection consisted of a very fine wire which provided an electrical connection between the stylus and the transmission line. Therefore the wire provided a connection between the fixed transmission line and the moving, flexible stylus. Although the wire provided an adequate connection it had the disadvantages of (1) easily breaking due to its small diameter, (2) the length of the wire could vary during manufacturing and assembly of the system thereby changing the capacitance and inductance of the equivalent tuned circuit and (3) the stiffness of the wire adds tension to the stylus therefore being a mechanical detriment to the stylus tracking. If I wanted to change the stylus, I had to disconnect this wire and reconnect it again. It is therefore desirable to reduce the above described disadvantages as much as possible in an operating system.

Another problem associated with the above described systems is the proper choice for an RF ground return path. One technique that I have employed was to attach clips to the record and electrically couple them to the base of the record support which acted as the system ground. The clips provide an RF ground path between the stylus and system ground and at the same time held the record to the record turntable. The problem with the use of clips in the above systems was the introduction of a large reactance between the stylus and the RF return which provided added capacitance, inductance and loss from the resistance of the record. Since this unwanted reactance affects the detectability of the varying capacitance of the record, it is therefore desirable to minimize this reactance between the stylus and the RF ground return.

I noticed in systems of the type described above, that the sensitivity of the pickup system was less when the stylus was detecting the geometric variations in the record at the edge of the record than when the stylus detecting the geometric variation in the center of the record. It was also noticed that the pickup of stray noise was greater at the edge of the record than when the stylus was more towards the center of the record. The sensitivity increased and the pickup of stray noise decreased as more of the record was played. It is therefore desirable to correct these changes in sensitivity such that the sensitivity of the pickup device and its sensitivity to stray noise remains relatively constant over the entire record.

SUMMARY OF THE INVENTION

An information playback system for recovering information recorded on a record medium includes a first means for receiving the information and a conductive support housing. A second means including a source of signal energy is coupled to the first means. A flexibly mounted conductive member having first and second ends is provided with the first end movably connected to the support housing and the second end coupled to the first means. The conductive member mechanically supports the first means, and also forms a transmission line with the surrounding support housing. A tuned circuit is established which includes the reactance of the transmission line and the reactance of the first means. The source of signal energy is coupled to the tuned circuit for energizing the tuned circuit such that signals modulated by the record information are developed in the tuned circuit.

Pursuant to a further feature of the above described information playback system the conductive support housing is dimensioned so that, when positioned over the record medium for playback, a low impedance return path for signals developed in the tuned circuit is advantageously provided by capacitance between the record medium and the support housing.

DETAILED DESCRIPTION

Figure 1:
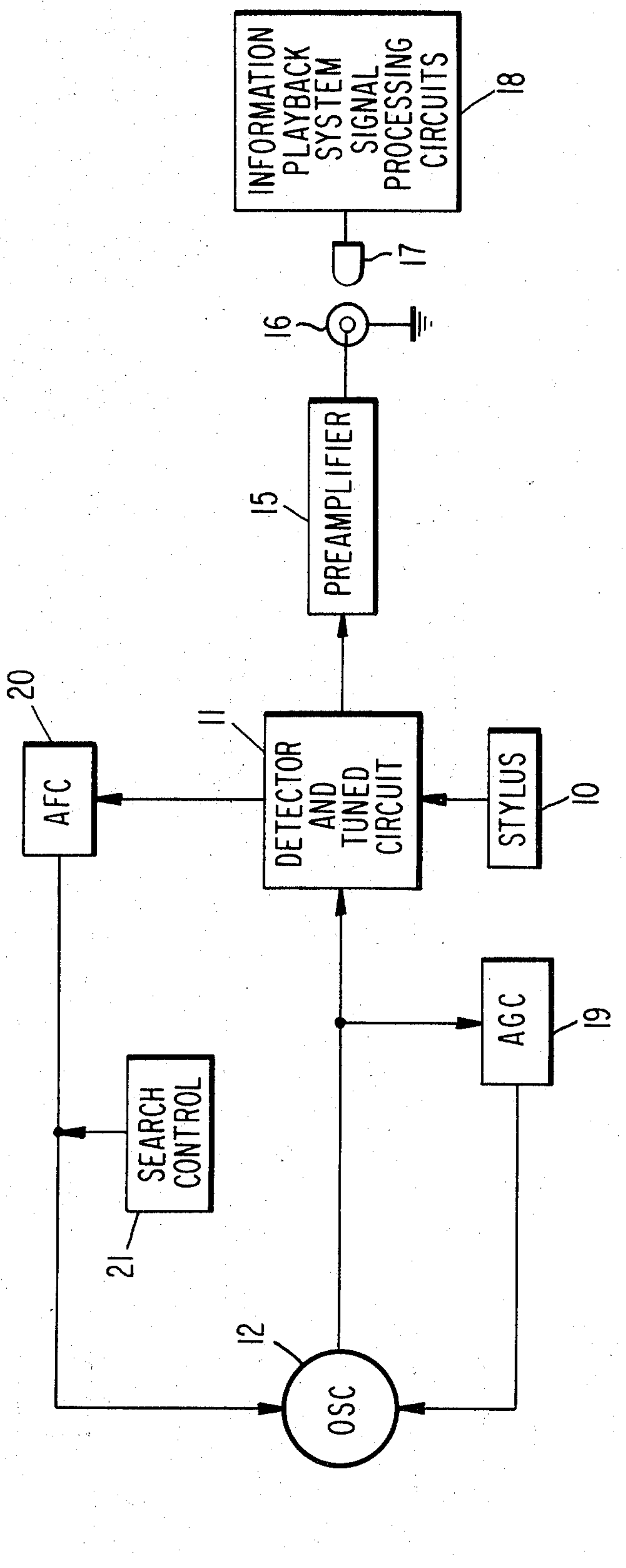
FIG. 1 is a block diagram of an information playback system according to the invention.

FIG. 1 is a block diagram of an information playback system according to the invention. A stylus 10 having a conductive surface which cooperates with geometric variations in a record medium, not shown, to form capacitive variations between the conductive surface of the stylus and the record medium. The capacitive variations form part of the tuned circuit in detector and tuned circuit stage 11. The detector and tuned circuit stage 11 includes a voltage doubling peak detector and a tuned circuit whose resonant frequency is varied by the geometric variations on the record. An oscillator stage 12 provides output signals which are mutually coupled by inductive coupling to the detector and tuned circuit stage 11. The signals coupled to the stage 11 energize the tuned circuit. As the resonant frequency of the tuned circuit is varied due to the geometric variations of the record medium, the response of the tuned circuit to the excitation voltage from the oscillator varies. The variations are detected by the voltage doubling peak detector and are applied to a preamplifier stage 15 before application by a jack 16 and plug 17 to the information playback system signal processing circuit 18. An automatic gain control stage 19 detects the level of signal being injected by the oscillator 12 into the tuned circuit of stage 11. The automatic gain control stage 19 adjusts the gain of the oscillator stage 12 to insure that the output signals from the oscillator stage are such that a signal of constant amplitude is injected into the tuned circuit in stage 11.

An automatic frequency control stage 20 is coupled between the detector and tuned circuit stage 11 and the oscillator stage 12. The automatic frequency control stage 20 adjusts the operating frequency of the oscillator stage to maintain a constant separation between the nominal center frequency of the tuned circuit of stage 11 and the frequency of the oscillator stage output signal. This insures that the system operates at the desired point on the slope of the tuned circuit response. For information playback systems described in the two U.S. patent applications noted above, the operating point is on the lower frequency slope or skirt of the tuned circuit frequency response. The automatic gain control stage 19 and automatic frequency control stage 20 each assure that a predetermined relationship exists between the excitation signals applied to the tuned circuit and the tuned circuit frequency response.

A search control stage 21 coupled to the oscillator stage is actuated when the frequency separation between the nominal frequency of the tuned circuit and the frequency of the oscillator stage output signals deviate beyond a set limit. Such deviations may occur when conditions are present which seriously affect the resonant frequency of the tuned circuit in stage 11, as for example, when the stylus is removed from the record during cueing. When the search control stage 21 is actuated, the operating frequency of the oscillator stage 12 adjusts to the initial search condition. The operating frequency is adjusted such that a known initial relationship is established between the nominal center frequency of the tuned circuit and the frequency of the oscillator stage output signals. At the initial search condition, the frequency of the oscillator stage output signals is well below its normal operating frequency but within the pull-in range of the automatic frequency control stage 20. The automatic frequency control stage 20 sweeps the operating frequency of the oscillator stage 16 until the predetermined frequency relationship between the nominal center frequency of the tune circuit and the frequency of the oscillator stage output signals are reestablished.

Figure 2A:
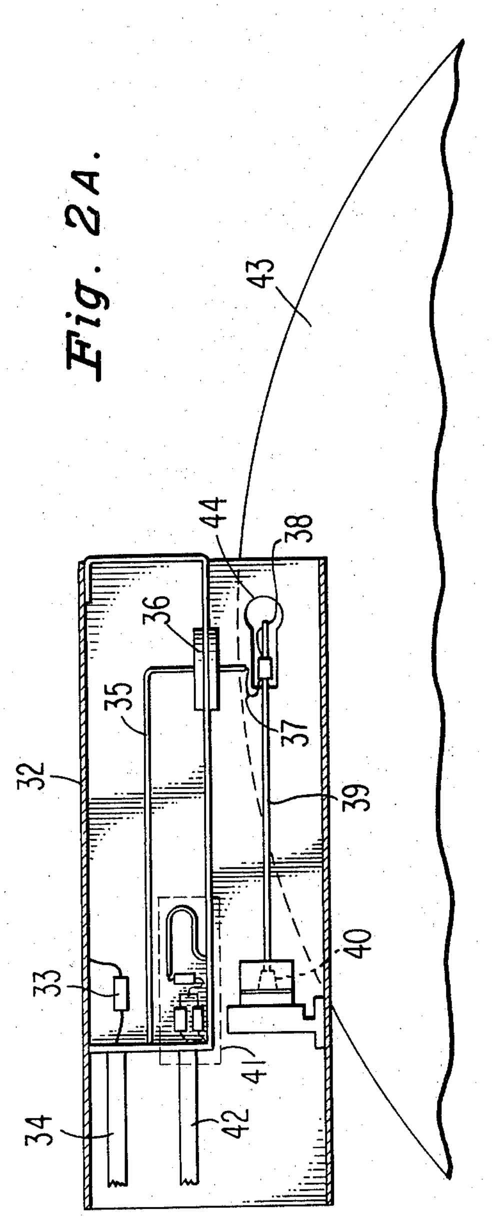
FIG. 2A is a top view of the tone arm assembly used in my prior application with the top of the assembly removed and FIG. 2B is a side view of the tone arm assembly shown in FIG. 2A with the side of the assembly removed.
Figure 2B:
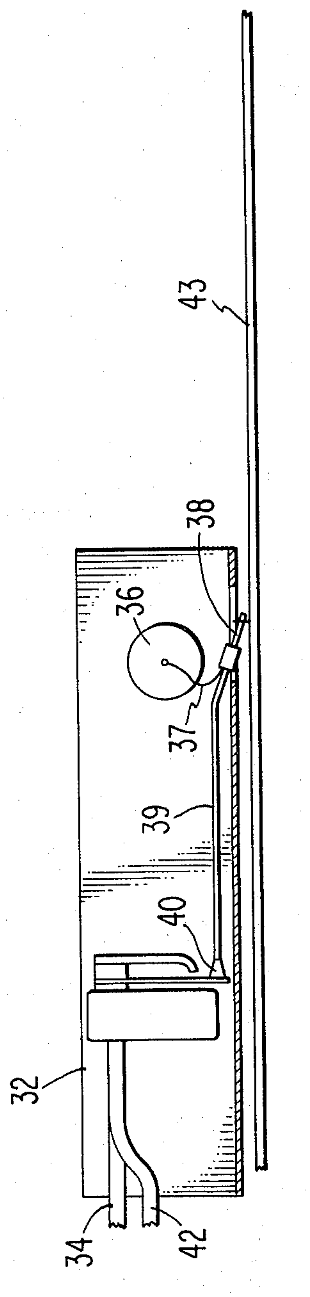

Reference is now made to FIG. 2A and 2B. FIG. 2A is the top view of a tone arm assembly used in my copending application previously mentioned, with the top of the asembly removed. High frequency signals from oscillator stage 12 from FIG. 1 are coupled to RF input connector 34. The RF input connector is coupled to terminating resistor 33 which is coupled to the tone arm housing 32 which acts as ground. Wire conductor 35 is coupled on one end to the grounded tone arm housing 32 and on the other to a stylus assembly 38 through a teflon disc insulator 36 and a fine wire connector 37. Wire conductor 35 forms an approximate quarter wavelength transmission line with the ground plane of the tone arm housing 32. Fine wire connector 37 couples the wire conductor 35 to the stylus assembly 38. Stylus assembly 38 passes through aperture 44 to the record 43 shown in FIG. 2B. As the capacitance between the stylus and the record varies, the frequency response of the tuned circuit varies. By virtue of mutual coupling, a variation in signal amplitude is detected by voltage doubling peak detector circuit 41. This signal is then coupled to video IF output 42 which is coupled to preamplifier 15 of FIG. 1. The stylus assembly 38 is supported by stylus support arm 39. Stylus support arm 39 is held to the tone arm assembly by a connection means 40 which allows for free flexible movement of the stylus support arm such that stylus assembly 38 can track the grooves of the record.

FIG. 2B shows a side view of the tone arm assembly shown in FIG. 2A with the side of the assembly removed. As can be seen, fine wire connector 37 provides tension to the stylus due to the stiffness of the wire and if the stiffness were to be diminished, the wire becomes subject to easy breakage due to its thin diameter. The teflon disc insulator while providing a coupling for wire connector 35 to fine wire connector 37 also adds capacitance to the transmission line which is undesirable since this capacitance affects the change in capacitance detectable by the tuned circuit.

Stylus support arm 39 must be strong enough to support the stylus assembly 38 and flexible enough to allow the stylus to track properly. It must also have electrical properties that do not add unwanted reactance which would affect the frequency response of the tuned circuit.

Figure 3A:
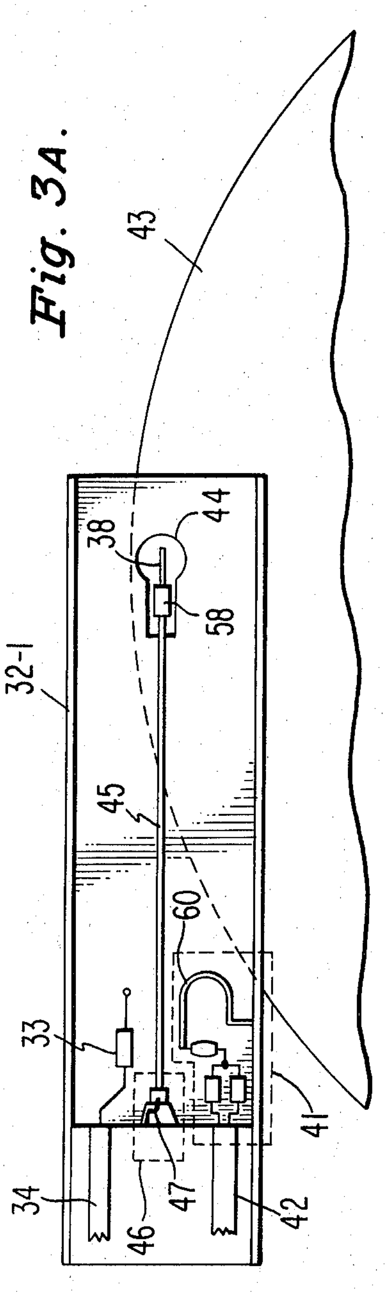
FIG. 3A is a top view of the tone arm assembly embodying the present invention with the top of the assembly removed and FIG. 3B is a side view of the tone arm assembly shown in FIG. 3A with the side of the assembly removed.

FIG. 3A illustrates a top view of the tone arm assembly embodying the present invention, with the top of the housing removed. High frequency signal energy from oscillator 12 of FIG. 1 is coupled to terminating resistor 33 through RF input connector 34. This high frequency signal energy is coupled to ground through the tone arm housing 32-1. Conductive member 45 supplies both support for the stylus assembly 38 and the necessary reactance for the tuned circuit. In this embodiment of the invention, the conductive member 45 is a hollow metal tube of predetermined length and diameter to provide the appropriate reactance and flexibility for the proper operation of the system. The conductive member 45 acts as the center conductor for a transmission line. The ground conductor of the transmission line is the tone arm housing 32-1. Wire 47 is used to short the conductive member 45 to ground. The length of wire 47 plus the length of the conductive member 45 and the length of conductor from the conductive member 45 to the stylus tip of stylus assembly 38 is chosen to provide an approximate one-quarter wavelength transmission line that is capacitively loaded at the stylus by the series combination of stylus to record variable capacitance and record to tone arm capacitance. Thus, a one-quarter wavelength type transmission line is formed which resonates at a chosen frequency. In a working embodiment of the invention, the nominal center frequency was chosen as 690 MHz. To achieve this frequency the length of conductive member 45 is 3.6 inches. The length of the electrical conductor between the stylus and the conductive member is 0.47 inch. It should be noted that the nominal center frequency of the tuned circuit may vary depending on the construction of the transmission line and position of adjacent circuit components. The conductive member may be fabricated from aluminum tubing 0.036 inch diameter of 1 mil thickness. In an illustrative system of the type described above where the capacitance variations are representative of frequency modulations of an RF carrier, frequency modulated geometric variations ranging over a band of frequencies from 500 KHz to 7.0 MHz recorded on a disc record are detected by stylus assembly 38. The capacitance variations vary the resonant frequency of the tuned circuit by plus or minus 200 KHz from its nominal center frequency at a rate ranging from 500 KHz to 7.0 MHz. Since the tuned circuit is inductively coupled to resistor 33 and its leads, the resonant frequency of the tuned circuit varies the response of the tuned circuit to the excitation signal as a function of the recorded information. Consequently, the varying signal energy of the tuned circuit is inductively coupled to pickup loop 60 of voltage doubling peak detector 41 which detects these signal voltage changes.

Figure 3B:
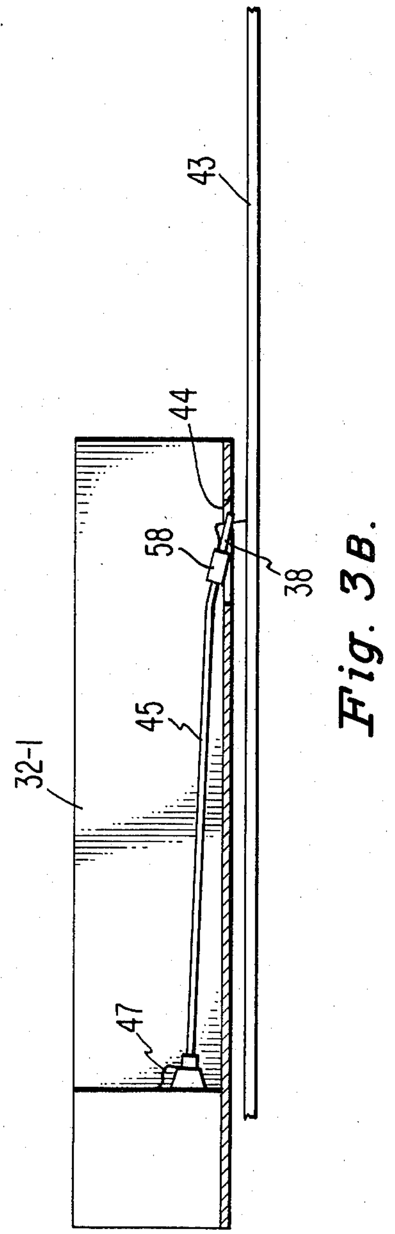

The output of voltage doubling peak detector 41, which contains signal voltage changes corresponding to the capacitance variations between the stylus tip and the metalization of the record as the record is moved, is coupled to video IF output 42 and fed to preamplifier 15 of FIG. 1. Conductive member 45 is coupled to compliant connection 46 which allows flexibility for the stylus to move more freely. The stylus assembly 38 passes through the opening 44 of tone arm housing 32-1 to allow for coupling to the record 43. Stylus assembly 38 can be coupled to conductive member 45 by a sleeve assembly 58 as shown in FIG. 3B with a small wire electrically coupling transmission line 45 to stylus 38. A more detailed description of sleeve assembly 58 is described in conjunction with FIG. 4C.

FIG. 3B shows a side view of tone arm housing 32-1 according to the invention with the side of the tone arm housing removed. As can be seen from this view, the fine wire connector 37 of FIG. 2A and the teflon disc insulator 36 are no longer part of the tone arm assembly. Also, the invention eliminates the need for separate stylus support arm and transmission line structures by having the transmission line also act as the stylus support. Now the electrical connection, sleeve assembly 58, between the stylus assembly and the transmission line can be large since it is essentially a nonflexible part and the length of the electrical conductor (not shown) of sleeve assembly 58 can be more closely controlled such that the reactance of the wire is more predictable. The larger the diameter the wire the less possibility of it breaking, and the shorter the length of the wire the less capacitance and inductance in the wire.

Other advantages of the above described tone arm assembly embodying the invention are the versatility and simplicity of the arm over those used in systems described in my above mentioned copending application, thereby allowing for ease of manufacturing and the reduction of the number of parts and connections. Also by the elimination of the number of parts and connections, stray reactance which affects the frequency response of the tuned circuit is also reduced. Because of the simplicity and versatility of the tone arm assembly by the elimination of a number of the elements, the optimization of certain physical and electrical properties of the tone arm assembly heretofore not easily achieved can more easily be incorporated.

In my copending application described above, a clip was used to provide the RF ground return and static ground return. The RF signals would pass from the stylus to the metalization of the record then pass along the metalization of the record to the ground clip generally located near the center of the record. The RF signal path would comprise an impedance representative of the inductance and resistance of the record between the clip and the stylus, forming a series impedance with a variable capacitance between the stylus and the metalization of the record. The greater the RF return impedance the less a change in the variable capacitance will affect the frequency response of the tuned circuit. Therefore the sensitivity of the system was reduced by the RF ground impedance. To eliminate this reduction in sensitivity, I here provide an RF ground return from the metalization of the record to the tone arm housing thereby eliminating the need for use of the clip as an RF return. To form this RF ground return, I utilize the capacitance formed between the metalization of the record and the area of the tone arm housing over the record. The parameters of the housing and its position over the record then become critical. A more detailed discussion of this capacitance and how to optimize it, will be described in conjunction with FIGS. 4A, 4B and 4C.

Stray reactance associated with the pickup system described above will have an effect upon the frequency response of the tuned circuit. The change in capacitance to be detected from the record medium (hereafter referred to as ΔC) is very small, on the order of $4 \times 10^{-16}$ (0.0004pf).

As described earlier this ΔC is part of a tuned circuit; therefore, a change in capacitance changes the resonant frequency of the tuned circuit from $f1$ to $f2$. The tuned circuit is energized by a constant amplitude, constant high frequency signal of approximately 700 MHz. This signal is mutually coupled to the tuned circuit by inductive coupling with resistor 33 and its leads. A voltage doubling peak detector is mutually coupled through inductive coupling to the tuned circuit. A change in the frequency response of the tuned circuit due to the change in the capacitance between the stylus and the recorded information produces a corresponding change in amplitude of the signal induced by mutual coupling into the peak detector. It is therefore desirable to have the change in resonant frequency, or $f2/f1$, as large as possible for a given change in capacitance, ΔC.

The resonant frequency change obtained is proportional to the change in capacitance over the minimum total equivalent capacitance, Ceq, of the tuned circuit, or ΔC/Ceq. It is therefore desirable to increase the change in capacitance, ΔC, and decrease the minimum total equivalent capacitance, Ceq, of the circuit. The use of the tone arm assembly described in FIGS. 3A and 3B embodying the invention allows for the optimizing of the physical and electrical properties of the system to decrease the minimum total equivalent capacitance of the circuit.

Figure 4A:
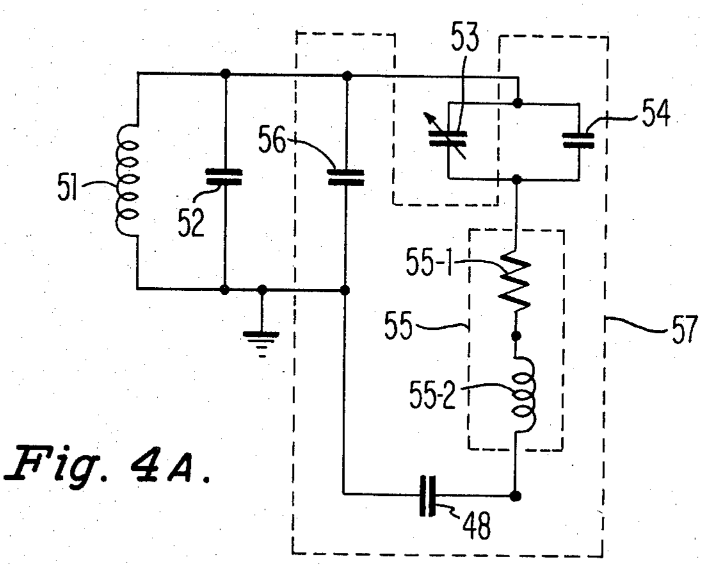
FIG. 4A is a circuit diagram illustrating the equivalent circuit of a tone arm assembly of FIG. 3A.

FIG. 4A shows the equivalent circuit of the reactance components of the tuned circuit in the system embodying the invention described in FIGS. 3A and 3B.

Inductor 51 and capacitor 52 comprise the equivalent reactance of the transmission line formed by conductive member 45 and conductive housing 32-1 of FIG. 3A. In the working embodiment described above, capacitor 52 is approximately equivalent to 0.45pf and inductor 51 is approximately equivalent to 0.005 microhenries. The reactance devices shown inside box 57 in FIG. 4A represent stray reactance components that should be controlled to ensure an adequate degree of change in the resonant frequency of the tuned circuit with change in capacitance on the record.

Variable capacitor 53 represents the variations (ΔC) of the capacitance between the metalization on the record medium and the stylus that occur as the record is moved. Shown in parallel with capacitor 53 is capacitor 54, representing the minimum capacitance between stylus and the metalization of the record. In the working embodiment described above, this capacitance is on the order of 0.1 to 0.15pf.

Capacitor 56, in parallel with capacitor 52 in FIG. 4A, represents the capacitance between conductive elements of the stylus assembly 38 and the tone arm housing 32-1. This capacitance is inversely proportional to the distance between the tone arm housing and the stylus assembly. Capacitance 56 can be reduced by increasing the distance between the stylus assembly 38 and the tone arm housing 32-1 (e.g., by enlarging aperture 44 in housing 32-1), but the greater the distance between the stylus assembly and the tone arm housing, the greater the impedance 55 of the FIG. 4A equivalent circuit. Impedance 55 represents the equivalent resistance 55-1 and equivalent inductance 55-2 of a path on the record between the stylus and a return path to RF ground, and is proportional to the distance an RF signal must travel on the record till it reaches a return path to RF ground. The larger the equivalent impedance 55, the less a change in capacitor 53 will affect the frequency response of the tuned circuit.

Figure 4B:
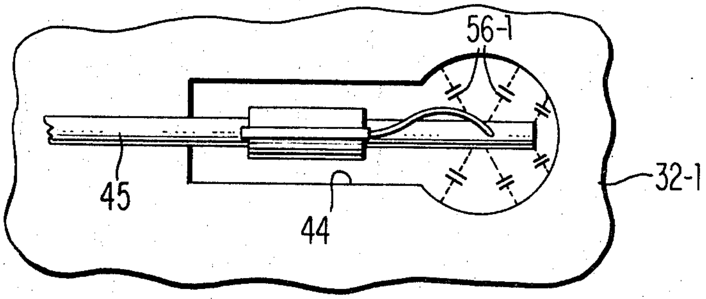
FIG. 4B is an enlarged view of the stylus opening shown in FIG. 3A
Figure 4C:
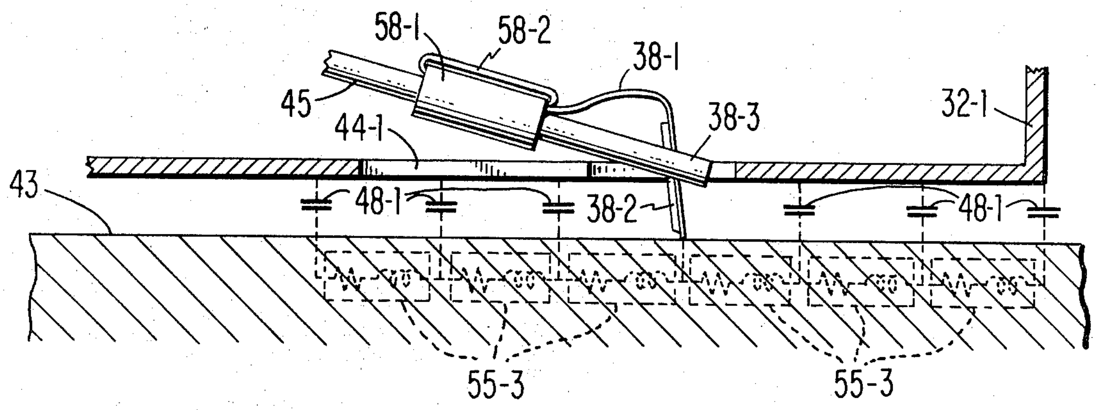
FIG. 4C is an enlarged view of the stylus assembly of FIG. 3B, also illustrating the inductive, capacitive and resistive elements associated with the RF ground return of the assembly shown in FIG. 3B.

To aid the explanation of the effects of the dimensioning of housing aperture 44 on the respective parameters 55 and 56 of the FIG. 4A equivalent circuit, FIGS. 4B and 4C present, in respective top and side views, an enlarged showing of the apertured region of housing 32-1, with an enlarged (and more detailed) showing of the stylus assembly 38 passing through the housing aperture.

As shown in the enlarged views of FIGS. 4B and 4C, the stylus assembly 38 is comprised of a stylus 38-2, a stylus holder 38-3, and a wire connector 38-1. Stylus holder 38-3 mechanically holds the stylus 38-2 in a desired position, permitting reception of the stylus tip in the record groove. Wire connector 38-1 provides an electrical connection to the conductive electrode of the stylus 38-2. Reference may be made to the copending application, U.S. Ser. No. 286,657, entitled "INFORMATION PLAYBACK SYSTEM STYLUS," filed by Leedom, et al. on Sept. 6, 1972, for a detailed description of an advantageous form of construction that may be employed for stylus 38-2. Sleeve assembly 58 is comprised of flexible coupler 58-1 and wire conductor 58-2. Sleeve assembly 58 mechanically and electrically couples conductive member 45 to stylus assembly 38. Flexible coupler 58-1 mechanically secures conductive member 45 to the stylus holder 38-3, and also holds wire conductor 58-2 in contact with conductive member 45 and wire connector 38-1 to thereby provide electrical coupling between conductive member 45 and the conductive electrode of the stylus 38-2.

In FIG. 4B, the distributed capacitance (capacitor 56 of the FIG. 4A equivalent circuit) between tone arm housing 32-1 and the conductive element of the above-described stylus assembly is diagramatically represented by capacitors 56-1, while in FIG. 4C the resistance and inductance components (impedance 55 of the FIG. 4A equivalent circuit) of the ground return path on the record 43 are diagramatically shown as impedances 55-3. The dimensions of the aperture 44 in housing 32-1 are preferably chosen to provide an acceptable compromise between the conflicting desires to both reduce the distributed capacitance value and reduce the value of impedance 55. Illustrative of dimensions providing an acceptable compromise are provisions for a radius of approximately 0.125 inch for the circular portion of the opening, with the adjacent slot-like portion approximately 0.180 inch wide and 0.4 inch long. With such dimensions, capacitor 56 of the FIG. 4A equivalent circuit of the illustrative embodiment has a capacitance value of the order of approximately 0.03pf.

A final element of the FIG. 4A equivalent circuit is capacitor 48, which is shown in series with impedance 55 between the parallel combination of capacitors 53, 54 and the grounded terminal of inductor 51. Capacitor 48 corresponds to the distributed capacitance between the tone arm housing 32-1 and the metalization on the record 43, and is diagramatically represented in FIG. 4C by the capacity components 48-1.

By positioning the housing opening (through which the stylus assembly 38 passes) sufficiently far from the inside (record center facing) edge of housing 32-1, one may ensure the presence of a low impedance path for the modulated RF signals between the record metalization and the (grounded) conductive housing 32-1 for all playing positions (from record edge to record center). That is, an area of the record will be overlapped by the housing, even when the stylus is at the record edge, which area is sufficiently large that the distributed capacitance between metalization and housing will provide a low impedance ground return path for the modulated RF signals for all playing positions.

In the working embodiment described above (with the distance from the edge of the slot of aperture 44 to the inside housing edge chosen to be approximately 0.535 inch), capacitor 48 of FIG. 4A has an equivalent capacitance on the order of 10pf. Desirably, this capacitance should be two orders of magnitude greater than capacitance 54 to ensure good performance even when the record, due to warping, changes the distance between the record and the tone arm housing by up to 25 percent. By increasing this capacitance (as through the above-described increase in housing overlap at record edge), pickup sensitivity is enhanced, the radiation of RF signals is reduced and the pickup of stray RF signals is minimized. The distance between the record and tone arm housing should also be kept as small as possible (the limiting factor here being allowance for record warp), since the capacitance is also dependent upon the distance between the two electrodes forming the capacitor. Since the tone arm assembly has been simplified by the dual use of the conductive member 45 shown in FIGS. 3A and 3B, optimization of the record edge overlap by the tone arm assembly is more easily achieved. This can be observed by comparing the record area overlapped by the tone arm housing 32 in FIG. 2A with the record area overlapped by the improved tone arm housing 32-1 in FIG. 3A.

What is claimed is:

1. An information playback system for recovering information recorded on a record medium, said information playback system comprising:

pickup means for establishing a reactance subject to variations in accordance with said recorded information;

a conductive support housing;

an elongated conductive member having first and second ends and being enclosed within said conductive support housing throughout at least a major portion of its length, said first end being pivotally mounted within said support housing so as to permit relative motion between said conductive member and said enclosing support housing, and said second end being mechanically and electrically coupled to said pickup means so that said conductive member mechanically supports said pickup means in a manner permitting motion of said pickup means relative to said housing, and so that a transmission line formed due to the electrical relationship between said conductive member and said enclosing support housing is electrically connected to said pickup means in a manner establishing a tuned circuit which includes the reactance exhibited by said transmission line and the reactance established by said pickup means.

2. A information playback system as described in claim 1 wherein said pickup means forms a capacitance with said record medium, said capacitance varying as said record is moved.

3. An information playback system as described in claim 2 including a source of signal energy coupled to said tuned circuit for energizing said tuned circuit such that signals modulated by said record information are developed in said tuned circuit as said record is moved, said playback system also including detector means coupled to said tuned circuit for detecting said modulated signals developed in said tuned circuit.

4. A information playback system for use with a record medium having information recorded thereon, said system comprising:

means for moving said record medium;

pickup means for establishing a reactance subject to variations in accordance with the information recorded on said record medium as said medium is moved;

said reactance variations comprising capacitive variations between said record medium and said pickup means;

a conductive support housing;

an elongated conductive member having first and second ends and being enclosed within said conductive support housing throughout at least a major portion of its length, said first end being pivotally mounted within said support housing so as to permit relative motion between said conductive member and said enclosing support housing, and said second end being mechanically and electrically coupled to said pickup means so that said conductive member mechanically supports said pickup means in a manner permitting motion of said pickup means relative to said housing, and so that a transmission line formed due to the electrical relationship between said conductive member and said enclosing support housing is electrically connected to said pickup means in a manner establishing a tuned circuit which includes the reactance exhibited by said transmission line and the reactance established by said pickup means, said tuned circuit having a resonant frequency which is subject to variation over a given range of frequencies as the reactance established by pickup means varies during movement of said record medium;

a source of oscillations at a frequency in the immediate vicinity of, but outside, said given range of frequencies; and means, mounted within said conductive support housing, for providing an inductive coupling between said source and said tuned circuit so as to energize said tuned circuit with said oscillations.

5. An information playback system as described in claim 4 wherein the length of said conductive member is chosen so that the effective length of said transmission line closely approximates one-quarter wave length at a frequency within said given range of frequencies.

6. An information playback system as defined in claim 4 including means, mounted within said conductive housing and inductively coupled to said tuned circuit, for detecting variations in the amplitude of oscillations appearing across said tuned circuit.

7. An information playback system as defined in claim 6 for use with a record medium in the form of a grooved disc record having video information recorded in a groove thereof, wherein said pickup means comprises a groove tracking stylus including a conductive electrode, and wherein the frequency of oscillations provided by said source greatly exceeds the recorded video information frequencies.

8. An information playback system for use with a disc record having a spiral groove in a surface layer of dielectric material, with video information recorded in said groove, and with a layer of conductive material underlying said surface layer; said system comprising:

a source of oscillations at a predetermined frequency;

means for rotating said disc record;

a conductive housing;

a tracking stylus for engaging said record groove during playback of said disc record, said stylus including a conductive electrode for forming a capacitance with said disc record layer of conductive material, said capacitance varying, according to the information recorded in said disc record groove, as said disc record is rotated;

an elongated conductive member having first and second ends and being enclosed within said conductive support housing throughout at least a major portion of its length; said first end being pivotally mounted within said support housing so as to permit relative motion between said conductive member and said enclosing support housing; and said second end being mechanically and electrically coupled to said tracking stylus so that said conductive member mechanically supports said tracking stylus in a manner permitting motion of said tracking stylus relative to said housing, and so that a transmission line formed due to the electrical relationship between said conductive member and said enclosing support housing is electrically connected to said stylus electrode in a manner establishing a tuned circuit which includes the reactance exhibited by said transmission line and the varying capacitance formed by said tracking stylus electrode and said disc record layer of conductive material; said tuned circuit having a resonant frequency subject to variation, over a range of frequencies in the immediate vicinity of said predetermined frequency, in response to said capacitance variations;

means, mounted within said conductive housing and inductively coupled to said tuned circuit, for applying oscillations from said source to said tuned circuit; and detector means, mounted within said conductive housing and inductively coupled to said tuned circuit, for detecting variations in the response of said tuned circuit to said oscillations, said detector means providing output signals corresponding to said recorded video information.

9. An information playback system as described in claim 8 wherein said variations of the resonant frequency of said tuned circuit, occurring in response to said capacitive variations between said record layer and said tracking stylus electrode as said record is rotated, cause amplitude modulation of said oscillations applied to said tuned circuit;

and wherein said detector means comprises an amplitude modulation detector.

10. An information playback system for use with a video disc record of a type having a spiral groove in a surface thereof, with the groove bottom geometry varying along said groove in representation of recorded video information, with a conductive layer overlying said grooved surface, and with a dielectric coating overlying said conductive layer; said system comprising:

means for rotating said disc record;

a stylus for engaging the coated bottom of said record groove during playback of said record, said stylus including a conductive electrode for forming a capacitance with said disc record's conductive layer, said capacitance being subject to variations in accordance with said groove bottom geometry variations representative of the information recorded on said record as said disc record is rotated;

a hollow support housing of conductive material, having a bottom surface with an aperture therein; said housing being subject to orientation during record playback such that said aperture overlies the record groove convolution undergoing stylus engagement under conditions of close spacing between said bottom housing surface and the coated record surface;

a stylus support arm of conductive material extending within said conductive support housing between a first end, pivotally mounted within said housing to permit pivotal motion of said arm relative to said housing, and a second end, located in the vicinity of said aperture and subject to protrusion therethrough during record playback;

said conductive support housing bottom surface being shaped and dimensioned relative to the periphery of said aperture such that the area of said bottom surface overshadowing the coated record surface during stylus engagement of the outermost record groove convolution forms a capacitance with the record's conductive layer that is many times greater than the capacitance formed between said conductive electrode of said stylus and the record's conductive layer;

means for mechanically and electrically coupling said stylus to said second end of said stylus support arm such that (a) said stylus is mechanically supported by said second end of said support arm and (b) said stylus electrode is electrically connected to said second end of said conductive support arm.

11. An information playback system as described in claim 10 wherein said capacitance between housing surface and record layer is approximately two orders of magnitude greater than the value of said capacitance formed between stylus electrode and record layer.

12. An information playback system as described in claim 11 wherein said greater capacitance has a value of at least approximately 10 pf.

13. An information playback system in accordance with claim 10 wherein a tuned circuit which includes (1) the reactance exhibited by a transmission line formed by said conductive stylus support arm and the enclosing conductive housing, and (2) the capacitance formed by said stylus electrode and said conductive record layer, is completed during record playback by (3) the capacitance formed by the overshadowing area of said housing bottom surface and said conductive record layer, said tuned circuit having a resonant frequency which is subject to variation over a range of frequencies in response to said stylus-record capacitance variations as said record is rotated; and wherein said system also includes:

a source of oscillations at a predetermined frequency in the immediate vicinity of said range of frequencies;

means, mounted within said conductive housing and inductively coupled to said tuned circuit, for applying oscillations from said source to said tuned circuit; and detector means, mounted within said conductive housing and inductively coupled to said tuned circuit, for detecting variations in the response of said tuned circuit to said oscillations.

* * * * *